May 12, 1970  J. B. SWETT ET AL  3,511,288
CONTAINER FOR PASTRIES OR THE LIKE AND METHOD
OF DISPLAYING PASTRY
Filed April 23, 1968  2 Sheets-Sheet 1
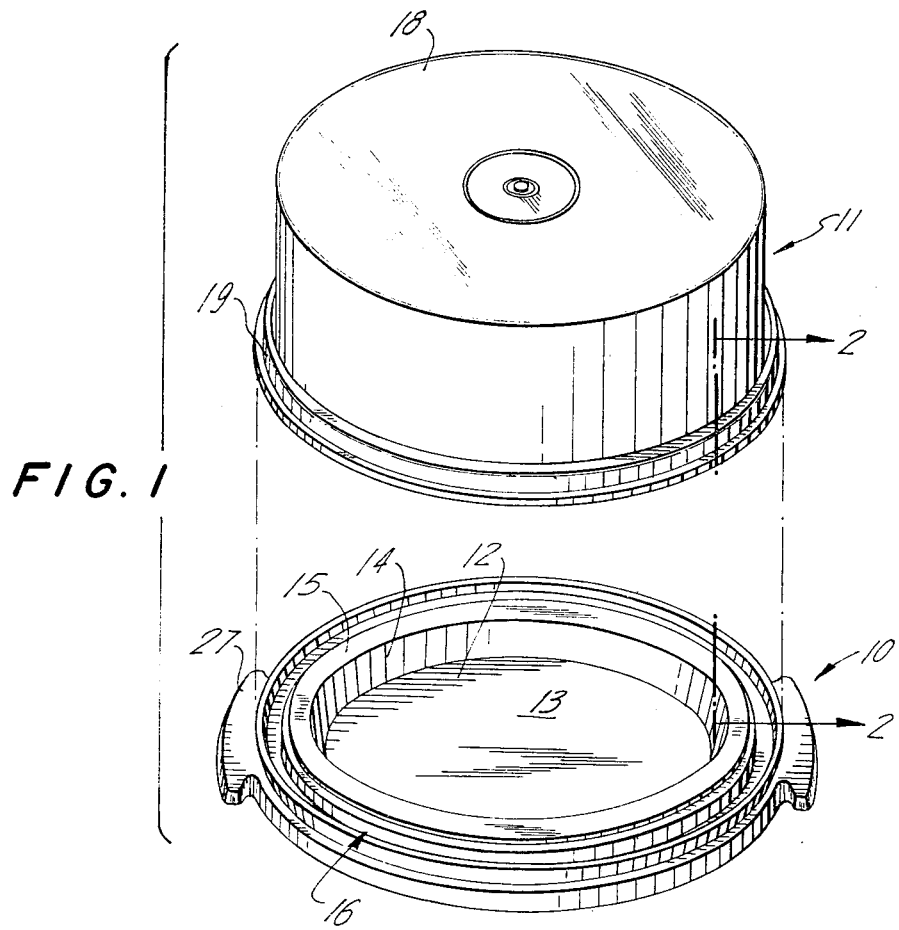
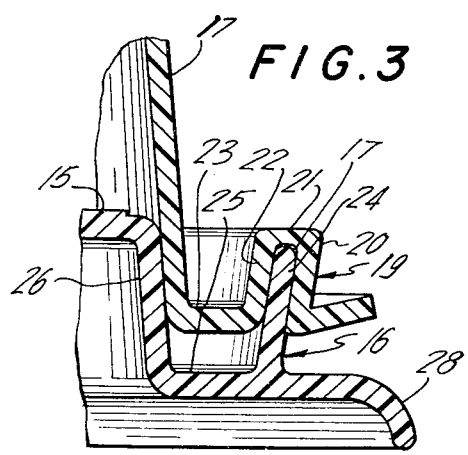
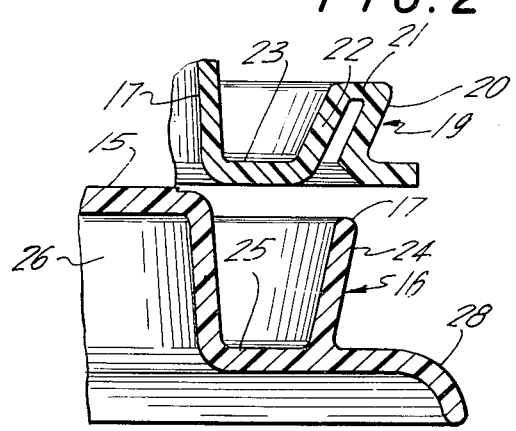
INVENTORS.
JAMES B. SWETT
ROBERT F. BATEMAN
BY
Paul R. Wylie
ATTORNEY INVENTORS.
JAMES B. SWETT
ROBERT F. BATEMAN
BY Paul R. Wylie
ATTORNEY

United States Patent Office 3,511,288
Patented May 12, 1970

3,511,288
CONTAINER FOR PASTRIES OR THE LIKE AND METHOD OF DISPLAYING PASTRY
James B. Swett, Barrington, and Robert F. Bateman, Providence, R.I., assignors to Dart Industries Inc., Los Angeles, Calif., a corporation of Delaware
Filed Apr. 23, 1968, Ser. No. 723,384
Int. Cl. B65d 5/52; A47g 19/32
U.S. Cl. 150—.5                                    1 Claim

ABSTRACT OF THE DISCLOSURE

A container for pastries including a base member and a cover member and a pie plate. The base member has a recessed central portion adapted to receive the pie plate and the cover member has an upwardly raised central portion to provide clearance for the contents of the pie plate. The base member has a bottom edge portion adapted to interfit with the cover so that the base member can be positioned on the cover which then serves as a pedestal to display the pastry. A method of displaying a pastry is also provided.

---

This invention generally relates to containers. More specifically, it relates to a container that is particularly well adapted for storing pastries, such as pies.

The containers according to this invention are of the type that can be completely sealed to eliminate moisture ingress or egress. Broadly, the container according to the invention comprises a base member having a recessed central portion uniquely adapted to receive a pastry plate and a cover member having an outwardly raised central wall portion adapted to form, with the recessed portion, an enclosure for pastry such as a pie. A feature of the invention is the combination of the foregoing container members with a pastry plate that is dimensioned to facilitate its removal from the recessed portion. Additionally, the plate and recessed portion are dimensioned so that the plate or contents therein will not come into contact with the cover member walls.

In another aspect of the invention, there is provided a method of displaying a pastry. The method broadly contemplates the utilization of a pastry container of the type having a base member with a bottom portion adapted to interfit with the lower edge of a cover therefor, said cover having a flat bottom. The method includes the steps of interfitting the cover with the bottom of the base member, positioning the cover and base member thus assembled to rest upon the flat cover top, and positioning a pastry in display position on the upper display surface of the pastry container. The method disclosed can be practiced with the container of this invention, or with other containers such as that disclosed in U.S. Pat. 3,307,-603 to James B. Swett, issued Mar. 7, 1967.

It is an object of this invention to provide a container for pastries or the like whereby the pastry will not come into contact with the inside surfaces of the container.

Another object of the invention is a provision of such a container and a pastry plate in combination therewith, said container and pastry plate being dimensioned to facilitate removal and handling of the latter.

Still another object of the invention is a provision of a container of the foregoing type that is sealed to prevent moisture ingress or egress.

Yet another object of the invention is a provision of a method for displaying pastries utilizing a pastry container.

The foregoing and other objects of the invention will be apparent from the attached drawings showing a specific embodiment of the invention and the following description thereof.

In the drawings:

FIG. 1 is an exploded perspective view showing the base and cover members of the container according to this invention;

FIG. 2 is a view in cross section taken on line 2—2 of FIG. 1 showing details of the peripheral edge portions of the base and cover members of the container according to the invention;

FIG. 3 is a view similar to FIG. 2 showing the peripheral edge portions of the base and cover members in assembled relationship;

Figure 4:
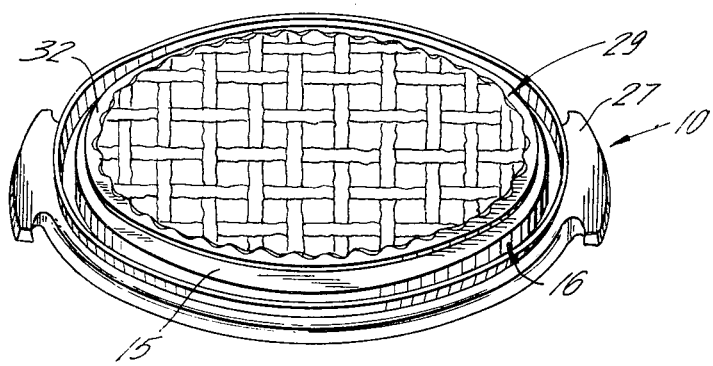
FIG. 4 is a perspective view showing the base member and pastry plate components of applicant's container in functional relationship.

Referring now to the drawings, FIG. 1 shows base member 10 of the container according to the invention, and cover member 11. As shown, the base member has a recessed central portion 12. The central portion has a flat base 13, a peripheral slanted wall portion 14 extending upwardly from said flat base portion, and a flat shoulder portion 15 extending outwardly from the upper terminus of said slanted wall portion. Shoulder portion 15 is substantially parallel to the plane of said flat base portion 13. Located adjacent said shoulder portion is a peripheral edge portion 16. The edge portion 16 is adapted to form a moisture-tight seal, with a cover member as will be hereinafter described.

Cover member 11 has an upwardly raised central wall portion formed by vertically upstanding side walls 17 and a flat top wall portion 18 extending from the upward terminus of wall 17. Peripheral edge portion 19 of cover 11 is adapted to form a moisture-tight seal with the peripheral edge portion 16 of base member 10 as will be hereinafter described.

The recessed central portion 12 of said base member 10 and the upwardly raised central wall portion formed by side walls 17 and flat wall 18 form an enclosure for pastry when the cover is installed on the base member.

Referring to FIG. 2, the peripheral edge portion 19 of container closure member 11 is formed with a downwardly directed U-shaped section formed of outer wall 20, connecting wall 21 and inner wall 22. An upwardly directed U-shaped section adjacent the downwardly directed section and sharing the common inner wall 22 therewith is formed of connecting wall 23 and upstanding side wall 17.

Peripheral edge portion 16 of base member 10 is formed with an outwardly flared peripheral flange 24. Adjacent said outwardly flared peripheral flange is an upwardly disposed U-shaped groove formed with the inside of flange 24, a bottom connecting wall 25 and inside wall 26.

FIG. 3 shows the respective positions of the peripheral edge portions 19 and 16 of the cover member and base member when such edge portions are engaged.

Base member 10 is provided with handle members 27 which facilitate the handling of such member when it is assembled with the other components of the container or when it is handled alone. The bottom side of base member 10 is formed with a downwardly turned flange 28. Such flange is adapted to interfit with the peripheral edge portion 19 of cover 11 as will be hereinafter described.

Base member 10 is preferably formed of a relatively rigid plastic material such as high density polyethylene or polypropylene. In using such a material, relatively thin wall thicknesses can be utilized without deterring from the rigidity and structural integrity of the article. This is in part due to the reinforcements that are inherent in the structure, including the reinforcements provided by downwardly turned flange 28 and the channel shaped structure formed by walls 26, 15 and 14. As an example, when a base member 10 having an outside diameter of about 11 inches is formed from polypropylene, a wall thickness of about 0.08 inch can be used. The cover 11 is preferably formed of a locally deformable plastic material such as low density polyethylene.

Figure 6:
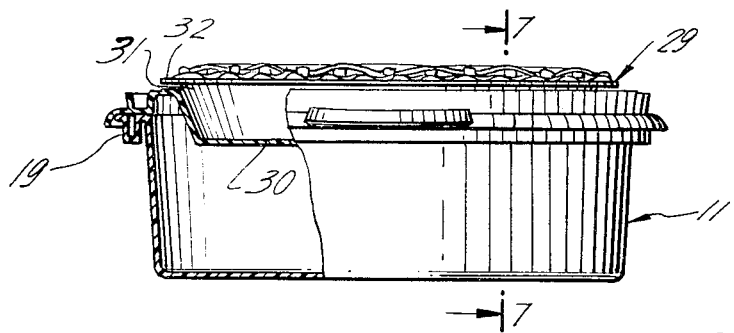
FIG. 6 is a view in cross section showing the components of the container according to the invention assemled in a position to display a pastry; and, FIG. 7 is a fragmentary cross section taken on line 7—7 of FIG. 6.
Figure 5:
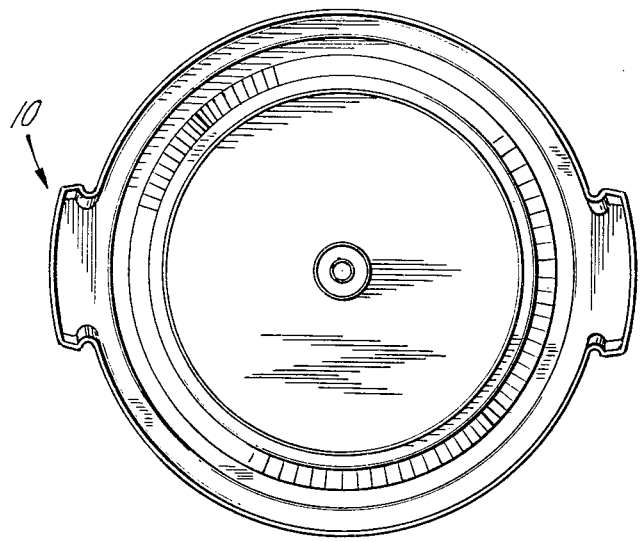
FIG. 5 is a bottom plan view of the base member according to the invention.

As best seen in FIG. 6, a pastry plate 29 is formed with a flat bottom 30 and angled side wall 31 extending upwardly and outwardly from the periphery of said flat bottom, and a flat annular rim 32 extending outwardly from the upper terminus of said angled wall portion. The annular rim 32 is substantially parallel to the plane of flat bottom 30. The dimensions of pastry plate 29 are such that the finger digits of a user will fit between the flat annular rim 32 and flat shoulder portion 15 of base member 10 when the pastry plate 29 is positioned in the recessed portion 13 of said base member 10.

The particular relationship of the annular rim of angle side wall 31 of pastry plate 29 with shoulder portion 15 and slanted side wall 14 of base member 10 provides other advantages. For example, if the pastry (such as the pie illustrated) is cut with a knife, there is no danger of marring either the upper portion of shoulder 15 or the upper edge of outwardly flared peripheral flange 17. Additionally, pastry plate 29 and the recessed portion 12 of base member 10 are dimensioned such that the edge of annular rim 32 will not extend beyond the outer edge portion of shoulder portion 15. Thus, the contents of the pastry plate cannot come into contact with wall portions 17 of cover 11. If the edges of the pie crust were permitted to come into contact with the wall 17 of cover 11, crumbling and marring of the crust would result.

Although the pastry plate 29 provides advantages when used in combination with base member 10 and cover 11 of the container according to the invention, nevertheless, a pastry (such as a pie) can be placed in recessed portion 12 of the pastry plate without benefit of plate 29.

The relationship between the upper edge of outwardly flared peripheral flange 17 and the upper surface of shoulder portion 15 is of importance. As best seen in FIG. 2, the upper edge of flange 17 and the upper surface of shoulder portion 15 are substantially level. By terminating flange 17 below or equal with the height of the upper surface of shoulder portion 15, the possibility of cutting or otherwise marring the edge of flange 17 is reduced. In cutting pastries, etc., that are positioned in recessed portion 12, the cutting implement will come into contact with shoulder portion 15 before it is permitted to contact the upper edge of peripheral flange 17. This would not be the case if the edge of peripheral flange 17 extended above the upper surface of shoulder portion 15. This advantage is particularly evident in a base member 10 of the type described having a recessed central portion, since a knife or other cutting utensil is somewhat more difficult to handle and control when performing cutting operations on an object placed on a plate of that type.

It is preferred to have the upper surface of shoulder 15 provided with a stippled finish so that knife scratches, etc., will not affect the appearance of the article.

Figure 7:
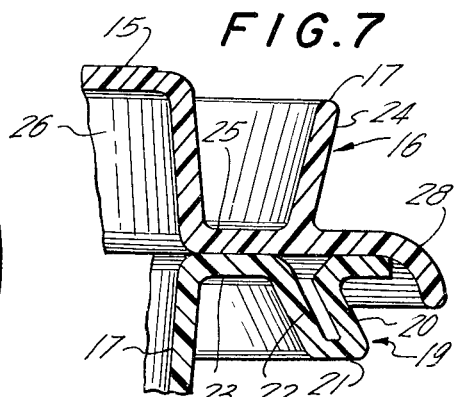

The container as described above also can be used according to the inventive method. This method entails the steps of interfitting the cover 11 with the bottom portion of base member 10. The interfitting relationship is best seen in FIGS. 6 and 7. In this relationship outwardly extending projections 20a fits inside downwardly turned flange 28. The method can also be practiced with other containers such as that shown in U.S. Pat. 3,307,603 to James B. Swett, issued Mar. 7, 1967. The base and cover thus interfitted are positioned to rest upon the flat cover top. The pastry is then placed in recessed portion 12 (if it is not already there) whereupon it will be positioned in an elevated display manner.

An additional advantage of the inventive method is realized by the placing of heating or cooling mediums in the inverted cover to maintain desired temperatures of the item displayed.

We claim:
1. A container for pastries or the like adapted for both the storage and display thereof and including:
   a base member having integral edge and recessed central portions, said edge portion further including an outwardly flared peripheral flange protruding upwardly from a substantially flat bottom connecting wall that has a substantially smooth underside and which terminates in a downwardly turned flange, said recessed central portion including a slanted wall portion being positioned inwardly of said flanges and extending downwardly to interconnect a flat base portion lying in a plane below that of the edge portion and downwardly turned flange, and
   a cover having an upwardly raised central wall portion and a peripheral edge means that is adapted for sealing engagement with said outwardly flared peripheral flange when said container is used for storage and for loosely mating with said substantially smooth underside of the bottom connecting wall adjacent the downwardly turned flange when said container is used for display purposes.

References Cited
UNITED STATES PATENTS

| | | | |
|---|---|---|---|
| 2,000,681 | 5/1935 | Weller | 206—45.2 |
| 183,283 | 10/1876 | Cate | 312—284 |
| 2,563,157 | 8/1951 | Castelli | 206—45.14 |
| 2,695,645 | 11/1954 | Tupper. | |
| 3,019,783 | 2/1962 | Clarke. | |
| 3,179,780 | 4/1965 | Verstraten | 220—17 |
| 3,307,603 | 3/1967 | Swett | 150—.5 |
| 3,346,099 | 10/1967 | Thomas et al. | 206—42 |

WILLIAM T. DIXSON, Jr., Primary Examiner

U.S. Cl. X.R.
206—45.20; 220—42; 312—284